(12) United States Patent  (10) Patent No.: US 7,748,636 B2
Finn  (45) Date of Patent: Jul. 6, 2010

(54) PORTABLE IDENTITY CARD READER SYSTEM FOR PHYSICAL AND LOGICAL ACCESS

(75) Inventor: David Finn, Tourmakeady (IE)

(73) Assignee: DPD Patent Trust Ltd., Lower Churchfield, Touma Ready, Co. Mayo (IE)

( * ) Notice: Subject to any disclaimer, the term of this patent is extended or adjusted under 35 U.S.C. 154(b) by 497 days.

(21) Appl. No.: 11/779,299

(22) Filed: Jul. 18, 2007

(65) Prior Publication Data

US 2008/0014867 A1    Jan. 17, 2008

Related U.S. Application Data

(63) Continuation-in-part of application No. 11/420,747, filed on May 27, 2006, now Pat. No. 7,597,250, and a continuation-in-part of application No. 11/355,264, filed on Feb. 15, 2006, and a continuation-in-part of application No. 10/990,296, filed on Nov. 16, 2004, now Pat. No. 7,213,766.

(60) Provisional application No. 60/832,799, filed on Jul. 24, 2006.

(51) Int. Cl.
*G06K 19/06*    (2006.01)
*G06K 7/08*    (2006.01)

(52) U.S. Cl. ..................... 235/492; 235/375; 235/380; 235/451; 235/487

(58) Field of Classification Search ................. 235/375, 235/380, 451, 487, 492
See application file for complete search history.

(56) References Cited

U.S. PATENT DOCUMENTS

| 4,014,602 | A | 3/1977 | Ruell |
| 4,367,965 | A | 1/1983 | Speitel et al. |
| 4,897,644 | A | 1/1990 | Hirano |
| 5,034,648 | A | 7/1991 | Gastgeb |
| 5,084,699 | A | 1/1992 | DeMichele |
| 5,376,778 | A | 12/1994 | Kreft |
| 5,399,847 | A | 3/1995 | Droz |
| 5,696,363 | A | 12/1997 | Larchevesque |
| 5,741,392 | A | 4/1998 | Droz |
| 5,761,648 | A | 6/1998 | Golden et al. |
| 6,067,235 | A | 5/2000 | Finn et al. |

(Continued)

FOREIGN PATENT DOCUMENTS

CA    2279176    7/1998

(Continued)

OTHER PUBLICATIONS

*ACR38CT Contactless SIM Tracker Technical Specification*, Advanced Card Systems Ltd., Hong Kong.

(Continued)

*Primary Examiner*—Thien Minh Le
*Assistant Examiner*—Tuyen K Vo
(74) *Attorney, Agent, or Firm*—Gerald E. Linden; Dwight A. Staffer

(57) ABSTRACT

A portable RFID reader apparatus having a contactless interface and slots or recesses for insertion of contactless smart card fobs, including ID card, and having a wireless interface for communicating with a token plugged into a computer, provides physical and logical access.

15 Claims, 2 Drawing Sheets

U.S. PATENT DOCUMENTS

| | | | |
|---|---|---|---|
| 6,070,240 A | 5/2000 | Xydis | |
| 6,085,320 A | 7/2000 | Kaliski, Jr. | |
| 6,111,288 A | 8/2000 | Watanabe et al. | |
| 6,148,354 A | 11/2000 | Ban et al. | |
| 6,168,077 B1 | 1/2001 | Gray et al. | |
| 6,172,430 B1 | 1/2001 | Schmitz et al. | |
| 6,181,024 B1 | 1/2001 | Geil et al. | |
| 6,189,098 B1 | 2/2001 | Kaliski, Jr. | |
| 6,240,184 B1 | 5/2001 | Huynh et al. | |
| 6,283,658 B1 | 9/2001 | Estevez et al. | |
| 6,307,471 B1 | 10/2001 | Xydis | |
| 6,341,727 B1 | 1/2002 | Canard et al. | |
| 6,342,839 B1 | 1/2002 | Curkendall et al. | |
| 6,343,744 B1 | 2/2002 | Shibata et al. | |
| 6,370,603 B1 | 4/2002 | Silverman et al. | |
| 6,385,677 B1 | 5/2002 | Yao | |
| 6,398,116 B1 | 6/2002 | Kreft | |
| 6,424,029 B1 | 7/2002 | Giesler | |
| 6,456,958 B1 | 9/2002 | Xydis | |
| 6,505,773 B1 | 1/2003 | Palmer et al. | |
| 6,522,308 B1 | 2/2003 | Mathieu | |
| 6,543,690 B2 | 4/2003 | Leydier et al. | |
| 6,560,711 B1 | 5/2003 | Given et al. | |
| 6,567,273 B1 | 5/2003 | Liu et al. | |
| 6,575,374 B1 | 6/2003 | Boyadjian et al. | |
| 6,592,031 B1* | 7/2003 | Klatt | 235/382 |
| 6,658,516 B2 | 12/2003 | Yao | |
| 6,694,399 B1 | 2/2004 | Leydier et al. | |
| 6,724,680 B1 | 4/2004 | Ng et al. | |
| 6,744,634 B2 | 6/2004 | Yen | |
| 6,745,042 B1 | 6/2004 | Xydis | |
| 6,748,541 B1 | 6/2004 | Margalit et al. | |
| 6,752,321 B1 | 6/2004 | Leaming | |
| 6,763,315 B2 | 7/2004 | Xydis | |
| 6,763,399 B2 | 7/2004 | Margalit et al. | |
| 6,772,956 B1 | 8/2004 | Leaming | |
| 6,798,169 B2 | 9/2004 | Stratmann et al. | |
| 6,801,956 B2 | 10/2004 | Feuser et al. | |
| 6,809,646 B1* | 10/2004 | Lee | 340/572.1 |
| 6,813,164 B2 | 11/2004 | Yen | |
| 6,839,772 B1 | 1/2005 | Kowalski et al. | |
| 6,848,045 B2 | 1/2005 | Long et al. | |
| 6,876,420 B2 | 4/2005 | Hong et al. | |
| 6,879,424 B2 | 4/2005 | Vincent et al. | |
| 6,879,597 B2 | 4/2005 | Tordera et al. | |
| 6,913,196 B2 | 7/2005 | Morrow et al. | |
| 6,963,794 B2 | 11/2005 | Geber et al. | |
| 6,983,888 B2 | 1/2006 | Weng | |
| 6,992,562 B2 | 1/2006 | Fuks et al. | |
| 7,034,238 B2 | 4/2006 | Uleski et al. | |
| 7,042,332 B2 | 5/2006 | Takamura et al. | |
| 7,054,050 B2 | 5/2006 | Vincent et al. | |
| 7,093,499 B2 | 8/2006 | Baudendistel | |
| 7,145,432 B2 | 12/2006 | Lussey et al. | |
| 7,150,397 B2 | 12/2006 | Morrow et al. | |
| 7,248,834 B2 | 7/2007 | Matsuo et al. | |
| 2001/0043702 A1 | 11/2001 | Elteto et al. | |
| 2001/0054148 A1* | 12/2001 | Hoornaert et al. | 713/172 |
| 2002/0011516 A1 | 1/2002 | Lee | |
| 2002/0065625 A1 | 5/2002 | Xydis | |
| 2002/0069030 A1 | 6/2002 | Xydis | |
| 2002/0104012 A1 | 8/2002 | Xydis | |
| 2003/0000267 A1 | 1/2003 | Jacob et al. | |
| 2003/0028797 A1 | 2/2003 | Long et al. | |
| 2003/0087601 A1 | 5/2003 | Agam et al. | |
| 2003/0102380 A1 | 6/2003 | Spencer | |
| 2003/0132301 A1 | 7/2003 | Selker | |
| 2003/0141365 A1 | 7/2003 | Sowa et al. | |
| 2003/0169152 A1 | 9/2003 | Charrat et al. | |
| 2003/0236821 A1 | 12/2003 | Jiau | |
| 2004/0073726 A1 | 4/2004 | Margalit et al. | |
| 2004/0118930 A1* | 6/2004 | Berardi et al. | 235/492 |
| 2004/0188519 A1* | 9/2004 | Cassone | 235/382 |
| 2005/0011961 A1* | 1/2005 | Uesaka | 235/492 |
| 2005/0040242 A1* | 2/2005 | Beenau et al. | 235/492 |
| 2005/0044424 A1 | 2/2005 | Xydis | |
| 2005/0109841 A1 | 5/2005 | Ryan et al. | |
| 2005/0269402 A1 | 12/2005 | Spitzer et al. | |
| 2005/0274803 A1 | 12/2005 | Lee | |
| 2006/0148404 A1 | 7/2006 | Wakim | |
| 2006/0186209 A1 | 8/2006 | Narend | |
| 2006/0213982 A1 | 9/2006 | Cannon et al. | |
| 2006/0226217 A1 | 10/2006 | Narend et al. | |
| 2006/0230437 A1 | 10/2006 | Boyer et al. | |
| 2006/0255903 A1 | 11/2006 | Lussey et al. | |
| 2006/0273176 A1 | 12/2006 | Audebert et al. | |
| 2007/0055633 A1 | 3/2007 | Cheon et al. | |
| 2007/0250707 A1 | 10/2007 | Noguchi | |
| 2007/0263596 A1 | 11/2007 | Carrat | |
| 2007/0290051 A1 | 12/2007 | Bielmann et al. | |
| 2008/0032626 A1 | 2/2008 | Chen | |

FOREIGN PATENT DOCUMENTS

| | | |
|---|---|---|
| DE | 19542900 | 5/1997 |
| DE | 19631050 | 2/1998 |
| DE | 19742126 | 3/1999 |
| DE | 100 60 866 C1 | 2/2002 |
| DE | 10140662 | 3/2003 |
| FR | 2728710 | 6/1996 |
| HK | 1063994 | 12/2004 |
| HK | 1063995 | 12/2004 |
| JP | 2004246720 | 9/2004 |
| WO | WO98/20450 | 5/1998 |
| WO | WO99 38062 | 7/1999 |
| WO | WO99 52051 | 10/1999 |
| WO | WO00 36252 | 6/2000 |
| WO | WO00 42491 | 7/2000 |
| WO | WO00 65180 | 11/2000 |
| WO | WO00 75755 | 12/2000 |
| WO | WO01 14179 | 3/2001 |
| WO | WO01 38673 | 3/2001 |
| WO | WO01 48339 | 7/2001 |
| WO | WO01 48342 | 7/2001 |
| WO | WO01 61692 | 8/2001 |
| WO | WO01 39102 | 11/2001 |
| WO | WO01 88693 | 11/2001 |
| WO | WO01 96990 | 12/2001 |
| WO | WO03 014887 | 2/2003 |
| WO | WO03 034189 | 4/2003 |
| WO | WO04 002058 | 12/2003 |
| WO | WO2004 081706 | 9/2004 |
| WO | WO2004 081769 | 9/2004 |
| WO | WO2005 022288 | 3/2005 |

OTHER PUBLICATIONS

*ACR38DT Dual Key Technical Specifications*, Version 1.3, Sep. 2004, Advanced Card Systems Ltd., Hong Kong.
*Dallas Semiconductor DS1490F 2-in-1 Fob*, Dallas Semiconductor, Dallas TX.
*Dallas Semiconductor DS9490R-DS9490B USB to 1-Wire/iButton Adaptor*, Maxim I-C, Sunnyvale CA.
*Matsushita blends FERAM technology with smart cards*, Hara, Yoshiko, EE Times, Oct. 1, 2004, CMP Media, Manhasset NY.
*Japan's Matsushita developing memory cards with smart chip function*, Oct. 1, 2004, Mercury News, San Jose CA.
*OTi-6828 Flash Disk Controller*, Ours Technology Inc., Taiwan.
*Panasonic Develops RFID smartSD Card*, Oct. 4, 2004, Palminfocenter.com, Sunnyvale CA.
*Panasonic Develops Industry's First SD Memory Card with Contacless Smart Card Capabilities*, Oct. 1, 2004, The Japan Corporate News Network, Tokyo.

*Panasonic's Smart SD adds RFID to the mix*, Rojas, Peter, Oct. 4, 2004, Engadget LLC, New York NY.
*Delivering ultimate security, high performance and ultra low power consumption, SmartMX is now in volume supply*, Nov. 18-20, 2003, Cartes 2003, aris Nort Villepinte, France.
*Digital Rights pits SIMS against Flash Cards, Card Technology*, Balaban, Dan, Nov. 2004, pp. 24, 25, 26, 28, 30, Card Technology, Chicago IL.

*Smart MX P5CT072 Secure Dual Interface PKI Smart Card Controller*, Rev. 1.3, Oct. 2004, Koninklijke Philips Electronics NV, The Netherlands.
*Vodafone KK Develops Contactless Smart Card Mobile Handset*, May 6, 2004, HiTEK Magazine, Dubai.
*SmartSD Card Structure*, Panasonic.

* cited by examiner

PORTABLE IDENTITY CARD READER SYSTEM FOR PHYSICAL AND LOGICAL ACCESS

CROSS-REFERENCE TO RELATED APPLICATIONS

This patent application claims benefit of the following U.S. Provisional and/or non-provisional patent applications, all of which are incorporated by reference in their entirety herein:

This is a continuation-in-part of Ser. No. 11/420,747 filed 27 May 2006 by Finn (hereinafter "C16").

This is a non-provisional filing of 60/832,799 filed 24 Jul. 2006 by Finn (hereinafter "C18").

This is a continuation-in-part of Ser. No. 11/355,264 filed Feb. 15, 2006 by Finn (hereinafter "C11"), which is a continuation-in-part of Ser. No. 10/990,296 filed Nov. 16, 2004 by Ryan et al. (hereinafter "C4", now U.S. Pat. No. 7,213,766 issued May 8, 2007).

TECHNICAL FIELD OF THE INVENTION

This invention relates to contactless smart card technology and to RFID (radio frequency identification) reader technology.

BACKGROUND OF THE INVENTION

U.S. Pat. No. 6,913,196 discloses a dual mode smart card controller (USB and ISO7816) that determines the type of card that is inserted into a slot. If the smart card is a USB smart card, the controller is adapted to pass control of the smart card to an external PC host USB hub circuit. If the smart card is an ISO7816 card, then control is handled by the dual mode controller. In another embodiment, the controller includes an embedded USB hub circuit to permit the controller to directly control both USB and ISO7816 smart cards. Exemplary control sequencing includes monitoring a C4 signal line for a pre-selected time period, or generating an enable signal if a USB smart card is detected. See also U.S. Pat. No. 7,150,397

US patent publication 2006/0226217 discloses a sleeve for electronic transaction card. A sleeve provides communications between an electronic transaction card and an intelligent electronic device. The intelligent electronic device may be a mobile phone or other device with or without network connectivity. The electronic transaction card may have magnetic field producing circuitry compatible with magnetic card readers, smartcard circuitry, other point-of-sale interfaces, or any combination thereof.

US patent publication 2005/0269402 discloses a financial transaction system utilizing multi-factor authentication to secure financial transactions. The following is claimed:

1. A portable transaction device comprising: memory to hold information regarding a financial card; a slot to interface with a re-programmable card; and software to generate single use transaction numbers.
2. The portable transaction device of claim 1 further comprising a biometric scanner where the portable transaction device is configured to combine biometric information with one or more additional authentication factors to secure financial transactions.
3. The portable transaction device of claim 1 further comprising a wireless interface to communicate with a secondary wireless device for an additional authentication factor.

US patent application 2006/0213982 discloses a smartcard-enabled BPID Security Device integrates a smartcard reader with a biometric authentication component to provide secured access to electronic systems. The device allows for an individual to insert a smartcard into an aperture in the physical enclosure of the BPID Security Device, allowing the smartcard and the BPID Security Device to electronically communicate with each other. The smartcard-enabled BPID Security Device is based on a custom application specific integrated circuit that incorporates smartcard terminals, such that the BPID Security Device can communicate directly with an inserted smartcard. In an alternative embodiment of the invention, the smartcard-enabled BPID Security Device is based on a commercial off-the-shelf microprocessor, and may communicate with a commercial off-the-shelf microprocessor smartcard receiver using a serial, USB, or other type of communication protocol. The device allows for enrolling a user's credentials onto the smartcard-enabled BPID Security Device. The device also allows for authenticating an individual using the smartcard-enabled BPID Security Device.

US patent application 2006/0230437 discloses a secure and transparent digital credential sharing arrangement which utilizes one or more cryptographic levels of indirection to obfuscate a sharing entity's credentials from those entities authorized to share the credentials. A security policy table is provided which allows the sharing entity to selectively authorize or revoke digital credential sharing among a plurality of entities. Various embodiments of the invention provide for secure storage and retrieval of digital credentials from security tokens such as smart cards. The secure sharing arrangement may be implemented in hierarchical or non-hierarchical embodiments as desired.)

Glossary & Definitions

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

Energy harvesting Also known as power harvesting, energy scavenging is the process by which energy may be captured and stored. Frequently this term is applied when speaking about small autonomous devices, like those used in sensor networks. A variety of different methods exist for harvesting energy, such as solar power, ocean tides, piezoelectricity, thermoelectricity, and physical motion.

Lanyard A lanyard, also spelled laniard, is a rope or cord often worn around the neck or wrist to carry something. Lanyards have started to appear on consumer electronics devices. With increasing miniaturization, many digital cameras, MP3 players, and USB memory sticks include lanyards, providing easy portability, and insurance against loss or dropping.

Proximity Card Proximity card is a generic name for contactless integrated circuit devices used for security access or payment systems. It can refer to the older 125 KHz devices or the newer 13.56 MHz contactless RFID cards, most commonly known as contactless smartcards. Modern proximity cards are covered by the ISO 14443 (Proximity Card) standard. There is also a related ISO 15693 (Vicinity Card) standard. Proximity cards use an LC circuit. An IC, capacitor, and coil are connected in series. The card reader presents a field that excites the coil and charges the capacitor, which in turn energizes the IC. IC then transmits the card number via the coil to the card reader. The card readers communicate in Wiegand protocol that consists of a data 0 and a data 1 circuit. The earliest cards were 26 bit. As demand has increased bit size has increased to continue to provide unique numbers. Often, the first several bits can be made identical. These are called facility or site code. The idea is that company "Alice" has a facility code of xn and a card set of 0001 through 1000 and company "Bob" has a facility code of yn and a card set also of 0001 through 1000.

USB CCID USB is short for Universal Serial Bus. CCID is short for Chip/Smart Card Interface Devices. ICCD is short for Integrated Circuit(s) Card Devices). CCID is intended to use one generic device driver for different types of Smart Card readers without the need of each vendor having to supply its own software driver.

Wiegand refer to the following paragraphs regarding the Wiegand effect, Wiegand interface, Wiegand protocol, Wiegand wire.

The Wiegand effect is a pulse-generating phenomenon in a special alloy wire that is processed in such a way as to create two distinct magnetic regions in the same homogeneous piece of wire, referred to as a shell and a core. It occurs when such a specially processed wire (a "Wiegand wire") is moved past a magnetic field. The two distinct magnetic regions react differently to any applied magnetic field: the shell requires a strong magnetic field to reverse its magnetic polarity, whereas the core will revert under weaker field conditions. The polarity of the wire will very rapidly shift and generate strong, short (~10 μs) electrical pulses without any additional external power being supplied. This is known as the "Barkhausen jump" or "Barkhausen effect". The Barkhausen jump can be detected by a coil wrapped around the material, when the small amount of voltage described above is generated.

The Wiegand interface is a defacto wiring standard, which arose from the popularity of Wigand effect RFID card readers in the 1980's. A Wiegand-compatible reader is normally connected to a Wiegand-compatible security panel.

The Wiegand interface uses two signal lines, termed data0 and data1. To transmit a zero bit, the data0 line is pulsed from 5V to 0V. To transmit a one bit, the data1 line is pulsed.

Wiegand protocol is a name for a system of sending data from a sensor such as a card reader or proximity sensor. It is commonly used to connect a card swipe mechanism to the rest of an electronic entry system. The sensor in such a system is often a Wiegand wire based on the Wiegand effect discovered by John R. Wiegand. The Wiegand protocol is apparently not formally defined in any one place.

The Wiegand protocol consists of three wires, one of which is a common ground, and two data transmission wires, usually called DATA0 and DATA1, but sometimes also labeled Data High and Data Low. When no data is being sent both DATA0 and DATA1 are at the high voltage. When a 0 is sent, the Data Low wire (also called DATA0) is at a low voltage while the Data High wire (also called DATA1) stays at the high voltage. When a 1 is sent, Data High is at the low voltage while Data Low stays at the high voltage. The high and low voltage levels are usually the TTL (transistor-transistor logic) voltage levels. A series of bits are sent, followed by a parity bit or bits. The number of bits sent at once varies according to the device, with 26 bits being common.

Contact Interfaces

As used herein, "contact interfaces" (or "mechanical interface") refers to mechanical (wired) connections between one device and another, such as via a cable or inserting a module into a socket. The following are examples of contact interfaces and/or devices that typically connect via a contact interface.

Ethernet A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards. A newer version of Ethernet, called 100Base-T (or Fast Ethernet), supports data transfer rates of 100 Mbps. And the newest version, Gigabit Ethernet supports data rates of 1 gigabit (1,000 megabits) per second.

IEEE 1394 IEEE 1394 (also known as FireWire® and iLINK™) is a high-bandwidth isochronous (real-time) interface for computers, peripherals, and consumer electronics products such as camcorders, VCRs, printers, PCs, TVs, and digital cameras. With IEEE 1394-compatible products and systems, users can transfer video or still images from a camera or camcorder to a printer, PC, or television (TV), with no image degradation.

ISO 7816 ISO7816 defines specification of smart card contact interface IC chip and IC card. The main ISO standard relating to smart cards is ISO7816: "Identification cards: integrated circuit cards with contacts".

SD Short for "Secure Digital". SD is a technology standard for providing portable devices with non-volatile memory/storage and peripheral I/O expansion capability. On some devices this standard is implemented in the form of SD memory expansion cards, used to store digital information like applications, databases, photos, text, audio, video or MP3 music files, and an SD/SDIO expansion slot. The SD standard makes it possible to transfer information between devices that support SD expansion cards (e.g. transfer photos between a digital camera and a PDA by exchanging the SD expansion card), assuming both devices support the file format used for the transferred information (e.g. JPEG image file).

SDIO Short for "Secure Digital Input/Output". SDIO is a part of the SD memory specification. It enables I/O (input/output) expansion for add-ons such as serial, modem, camera or GPS (global positioning system) cards. Whereas SD is only used for storage expansion cards, an SDIO capable expansion slot can also support SD expansion cards, while an SD-capable slot may not support an SDIO expansion card.

SIM Short for "Secure Identity Module" or "Subscriber Identification/Identity Module". A SIM card inscribed with a customer's information and designed to be inserted into any mobile telephone. Usually SIM card phones work by GSM technology. The SIM card contains a user's GSM mobile account information. SIM cards are portable between GSM devices—the user's mobile subscriber information moves to whatever device houses the SIM.

USB Short for "Universal Serial Bus". USB is a serial bus standard (standardized communications protocol) that enables data exchange between electronic devices. USB supports data transfer rates of up to 12 Mbps (megabits per second). A single USB port can be used to connect up to 127 peripheral devices, such as mice, modems, and keyboards. USB also supports plug-and-play installation and "hot plugging". USB is expected to completely replace serial and parallel ports. Hi-Speed USB (USB 2.0) similar to FireWire technology, supports data rates up to 480 Mbps.

Wireless Interfaces

As used herein, "wireless interfaces" refers to ultra-high radio frequency (RF) connections between one device and another, typically over a moderate distance, such as up to 100 meters, and in some cases (such as WiMAX) over long distances such as 50 km. The following are examples of wireless interfaces and/or devices that typically connect via a wireless interface.

WirelessTechnology that allows a user to communicate and/or connect to the Internet or mobile phone networks without physical wires. Wi-Fi, Bluetooth®, CDMA and GSM are all examples of wireless technology.

Bluetooth A wireless technology developed by Ericsson, Intel, Nokia and Toshiba that specifies how mobile phones, computers and PDAs interconnect with each other, with computers, and with office or home phones. The technology enables data connections between electronic devices in the 2.4 GHz range at 720 Kbps (kilo bits per second) within a 10 meter range. Bluetooth uses low-power radio frequencies to transfer information wirelessly between similarly equipped devices. A Bluetooth interface typically has a range of up to 10 meters, and is typically intended for private/personal communications such as connecting a user's mobile phone with his computer, or with a Bluetooth headset. Bluetooth bandwidth is specified at 720 Kbps.

IEEE 802.11 The IEEE standard for wireless Local Area Networks (LANs). It uses three different physical layers, 802.11a, 802.11b and 802.11g.

PAN short for private area network. Using a wireless connection such as Bluetooth, a PAN has a range of only several meters, such as up to 10 meters.

UWB UWB is short for "Ultra Wide Band". UWB is a wireless communications technology that transmits data in short pulses which are spread out over a wide swath of spectrum. Because the technology does not use a single frequency, UWB enjoys several potential advantages over single-frequency transmissions. For one, it can transmit data in large bursts because data is moving on several channels at once. Another advantage is that it can share frequencies, which is used by other applications because it transmits only for extremely short periods, which do not last long enough to cause interference with other signals.

UWB is a signaling technique using very short pulses to achieve very high transfer speeds. UWB it is not limited to wireless communication, UWB can also use mains-wiring, coaxial cable or twisted-pair cables to communicate. In a wireless mode, UWB may be similar in range to Bluetooth (typically up to 10 meters), but with a much greater bandwidth. Theoretically, WAN can achieve transfer speeds of up to 1 Gbit/s, versus only up to 3 Mbps for Bluetooth.

WAN short for wireless area network. Using a WAN connection such as 802.11, a WAN has a range of up to approximately 100 meters.

Wibree Wirebee is a digital radio technology (intended to become an open standard of wireless communications) designed for ultra low power consumption (button cell batteries) within a short range (10 meters/30 feet) based around low-cost transceiver microchips in each device. Wibree is designed to work side-by-side with and complement Bluetooth. It operates in 2.4 GHz ISM band with physical layer bit rate of 1 Mbps. Main applications include devices such as wrist watches, wireless keyboards, toys and sports sensors where low power-consumption is a key design requirement. The technology was announced 2006 Oct. 3 by Nokia. Partners that currently license the technology and cooperate in defining the specification are Nordic Semiconductor, Broadcom Corporation, CSR and Epson.

Wi-Fi Short for "Wireless Fidelity". Wireless technology, also known as 802.11b, enables you to access the Internet, to send and receive email, and browse the Web anywhere within range of a Wi-Fi access point, or HotSpot. Wi-Fi typically has a range of up to 100 meters, and is typically intended for connectivity to an Internet-capable appliance at a hot-spot. Wi-Fi bandwidth is specified at up to 54 Mbps (802.11a-5.0 GHz or 802.11b/g-2.4 GHz).

WiMAX short for Worldwide Interoperability for Microwave Access. (IEEE 802.16) WiMAX is a standards-based wireless technology that provides high-throughput broadband connections over long distances, such as several kilometers (up to 50 km with direct line-of-sight, up to 8 km without direct line-of-sight). WiMAX can be used for a number of applications, including "last mile" broadband connections, hotspots and cellular backhaul, and high-speed enterprise connectivity for business.

WLAN Short for "wireless local-area network". Also referred to as LAWN. A WLAN is a type of local-area network that uses high-frequency radio waves rather than wires for communication between nodes (e.g., between PCs).

ZigBee ZigBee is the name of a specification for a suite of high level communication protocols using small, low-power digital radios based on the IEEE 802.15.4 standard for wireless personal area networks (WPANs). ZigBee is targeted at RF applications that require a low data rate, long battery life, and secure networking.

Contactless Interfaces

As used herein, "contactless interfaces" refers to high radio frequency (RF) connections between one device and another, typically over a very short distance, such as only up to 50 cm. The following are examples of contactless interfaces and/or devices that typically connect via a contactless interface.

ISO 14443 ISO 14443 RFID cards; contactless proximity cards operating at 13.56 MHz with a read/write range of up to 10 cm. ISO 14443 defines the contactless interface smart card technical specification.

ISO 15693 ISO standard for contactless integrated circuits, such as used in RF-ID tags. ISO 15693 RFID cards; contactless vicinity cards operating at 13.56 MHz with a read/write range of up to 100 cm. (ISO 15693 is typically not used for financial transactions because of its relatively long range as compared with ISO 14443.)

NFC Short for "Near Field Communication". NFC is a contactless connectivity technology that enables short-range communication between electronic devices. If two devices are held close together (for example, a mobile phone and a personal digital assistant), NFC interfaces establish a peer-to-peer protocol, and information such as phone book details can be passed freely between them. NFC devices can be linked to contactless smart cards, and can operate like a contactless smart card, even when powered down. This means that a mobile phone can operate like a transportation card, and enable fare payment and access to the subway. NFC is an open platform technology standardized in ECMA (European Computer Manufacturers Association) 340 as well as ETSI (European Telecommunications Standards Institute) TS 102 190 V1.1.1 and ISO/IEC 18092. These standards specify the modulation schemes, coding, transfer speeds, and frame format of the RF interface of NFC devices, as well as initialization schemes and conditions required for data collision-control during initialization—for both passive and active modes.

RFID Short for "Radio Frequency Identification". An RFID device interacts, typically at a limited distance, with a "reader", and may be either "passive" (powered by the reader) or "active" (having its own power source, such as a battery).

Wireless Versus Contactless Interfaces

Wireless and Contactless are two types of radio frequency (RF) interfaces. In a most general sense, both are "wireless" in that they do not require wires, and that they use RF. However, in the art to which this invention most nearly pertains, the terms "wireless" and "contactless" have two very different meanings and two very different functionalities.

The wireless interfaces of interest in the present invention are principally WLAN, Zigbee, Bluetooth, Wibree and UWB. These wireless interfaces operate at a distance of several meters, generally for avoiding "cable spaghetti" for example, Bluetooth for headsets and other computer peripherals. WLAN is typically used for networking several computers in an office.

The contactless interfaces of interest in the present invention are principally RFID contactless interfaces such as ISO 14443, 15693 and NFC. RFID operates at a maximum distance of 100 cm for the purpose of identification in applications such as access control. In a payment (financial transaction) application, the distance is restricted to 10 cm. For example, a contactless RFID smart card protocol according to ISO 14443 can be used for private, secure financial transactions in "real world" applications such as payment at a retailer.

Wireless and contactless use different communications protocols with different capabilities and are typically used for very different purposes. Note, for example, that 100 cm (ISO 15693, an RFID contactless protocol) is considered to be too great a distance to provide appropriate security for (contactless) financial transactions. But 100 cm would not be enough to provide a (wireless) network between office computers! Additionally, generally, contactless technology is primarily passive (having no power source of its own), deriving power to operate from the electromagnetic field generated by a nearby reader. Also, contactless technology, using the smart card protocol, is used for secure identification, authentication and payment. Wireless technologies, on the other hand, generally require their own power source (either batteries, or plugged in) to operate. Contactless is different than wireless; different protocol, different signal characteristics, different utility, different energy requirements, different capabilities, different purposes, different advantages, different limitations.

Further Distinctions Between Wireless Interfaces

A distinction has been made between contactless interfaces operating at very short distances (such as only up to 10 cm, 50 cm or 100 cm) such as for secure financial transactions, and wireless interfaces operating at moderate distance, such as up to 100 m.

A further distinction can be made within the definition of wireless (short distances, such as up to 10 meters) between wireless connections for a private area network (PAN) operating at close range of only several meters (and ensuring a reasonable level of privacy), and wireless connections for a wireless area network (WAN) operating at a medium/moderate range of up to 100 meters to provide public access to the Internet, at hot spots, or to set up a wireless LAN within an office environment.

Thus, for purposes of this disclosure there are identified (and defined) 4 different "levels" (or types) of communication interfaces using radio frequency (RF) for transferring data between compatible devices, as follows:

"contactless", for very short distances, up to 100 cm (less than one meter), such as for performing secure applications such as access control, or financial transactions. (When carrying a smart card, a user needs to feel confident that the contents of the card cannot be snooped or skimmed from a nearby stranger wielding a laptop.) Within contactless, a further distinction can be made between extremely short distances (such as ISO 14443 operating at up to 10 cm distance, and useful for secure financial transactions) and moderately short distances (such as ISO 15693 having a read/write range of up to 100 cm, and useful for RFID used to collect tolls electronically).

"PAN wireless", effective at short distances, up to several meters (such as 10 meters), for providing a personal network, generally for a single user (telephone, computer, Bluetooth headset, computer peripherals), and providing a small measure of privacy based on the limited range of the signal. Also, Infrared (optical transmission), Zigbee, Bluetooth and UWB are used in private area networks.

"WAN wireless", effective at moderate distances, such as up to 100 meters, such as for networking computers in an office environment.

"WiMAX wireless", effective at long distances, such as up to 50 kilometers, for providing broadband access to the public (simultaneously to many users), which can hardly be considered to be private, without accompanying encryption of data/signal packets.

PRIOR ART PUBLICATIONS

The following patents and applications are incorporated by reference in their entirety herein. U.S. Pat. Nos. 6,763,315; 6,745,042; 6,560,711; 6,307,471; 6,070,240; 6,456,958. US patent application nos. 20050044424, 20020104012, 20020069030, 20020065625.

SUMMARY OF THE INVENTION

According to an embodiment of the invention, a portable RFID reader/card system comprises: a generally rectangular body; circuitry disposed within the body portion; and a contactless ID card disposed in close proximity to the body portion. The circuitry may be arranged to communicate with the contactless ID card in a contactless mode and with an external reader in a wireless mode. The contactless ID card may be disposed in a recess in a surface of the body portion. The contactless ID card may be clipped to a lanyard which is attached to the body portion.

According to an embodiment of the invention, a method of using a contactless ID card for physical entry comprises: disposing the ID card in close proximity to a portable reader system; and presenting the combination of card and reader apparatus to a mullion reader.

According to an embodiment of the invention, a method of using a contactless ID card for logical access comprises: disposing the ID card in close proximity to a portable reader system; and presenting the combination of card and reader apparatus to a wireless token associated with a personal computer. When the user is in the vicinity of their computer, a communication event may be opened up between the wireless token and combination of reader and ID card, thereby allowing the user to access a network after checking the credentials on the proximity (ID) card via the reader/card system. When the user moves away from their computer, the communication signal between the reader/card system and the wireless token deteriorates, and the computer automatically logs-off from the network or goes into password protected security mode. Once the reader/card system carried by the user is out of range of the Zigbee/Bluetooth The token may use a standard selected from the group consisting of Zigbee, Bluetooth, and Wibree.

BRIEF DESCRIPTION OF THE DRAWINGS

Reference will be made in detail to embodiments of the disclosure, examples of which may be illustrated in the accompanying drawing figures (FIGs). The figures are intended to be illustrative, not limiting. Although the invention is generally described in the context of these embodiments, it should be understood that it is not intended to limit the invention to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. In some cases, hidden lines may be drawn as dashed lines (this is conventional), but in other cases they may be drawn as solid lines.

Figure 1:
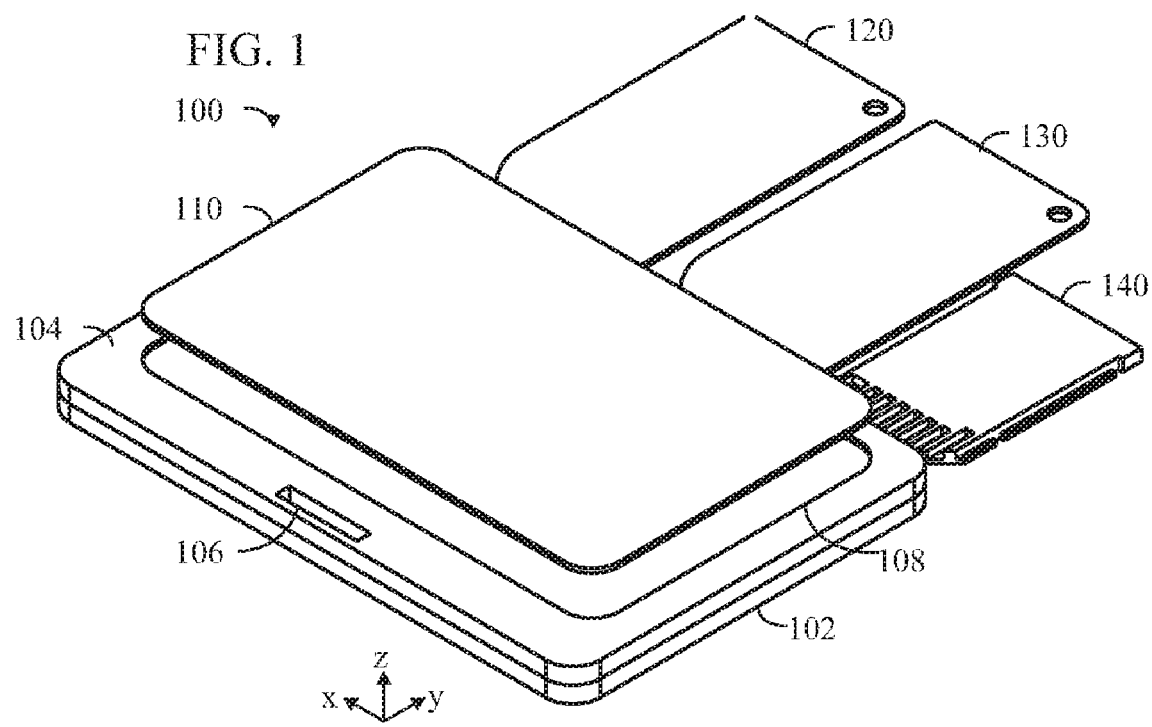

If shading or cross-hatching is used, it is intended to be of use in distinguishing one element from another (such as a cross-hatched element from a neighboring un-shaded element). It should be understood that it is not intended to limit the disclosure due to shading or cross-hatching in the drawing figures.

Elements of the figures may (or may not) be numbered as follows. The most significant digits (hundreds) of the reference number correspond to the figure number. For example, elements of FIG. 1 (FIG. 1) are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199*a*, 199*b*, 199*c*, etc. Such relationships, if any, between similar elements in the same or different figures will become apparent throughout the specification, including, if applicable, in the claims and abstract.

Figure 2:
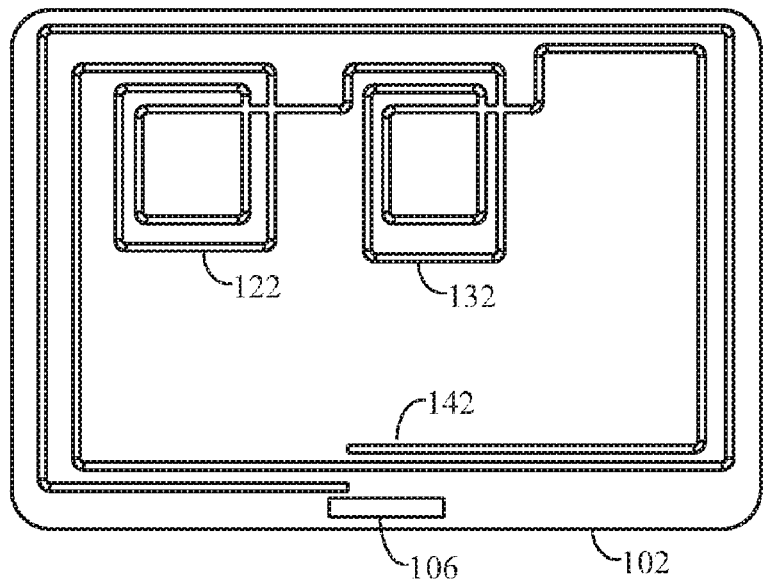

FIG. 1 is a perspective, exploded view of a portable card reader, according to an embodiment of the invention.

FIG. 2 is a schematic plan view of the card reader of FIG. 1.

Figure 3:
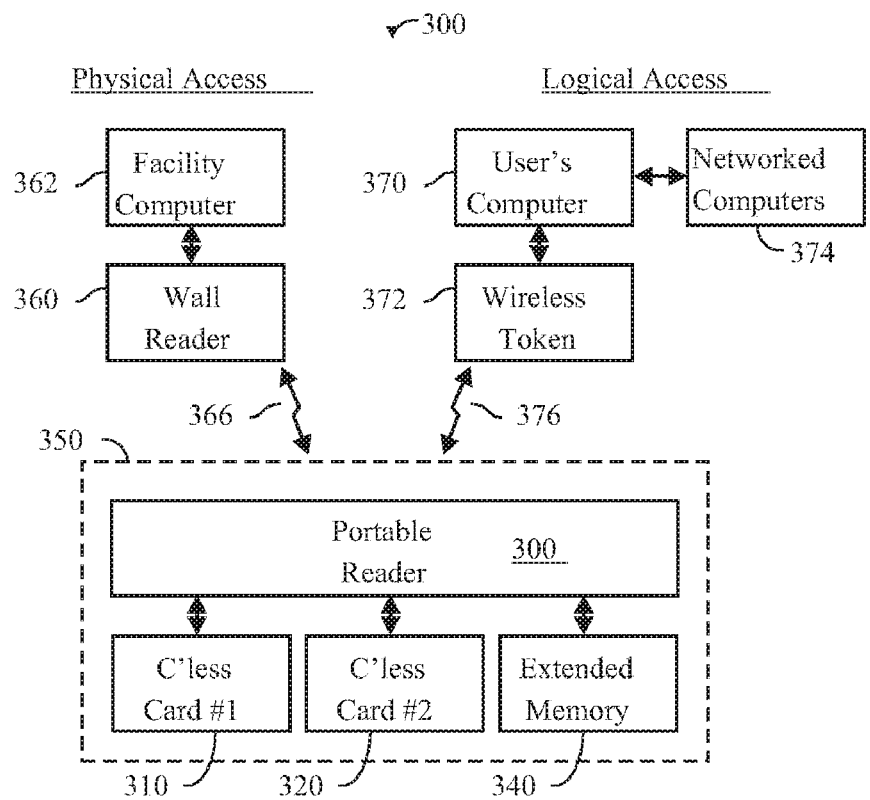

FIG. 3 is a diagram of a portable card reader in the context of physical and logical access(es), according to an embodiment of the invention.

Figure 4:
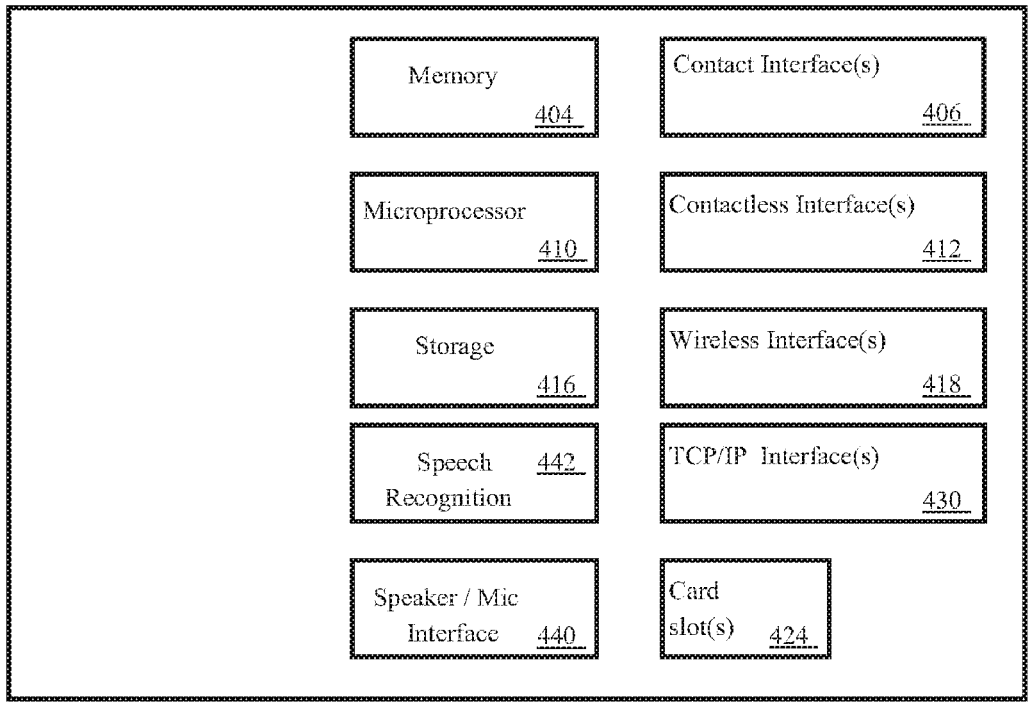

FIG. 4 is a diagram of major functional blocks of a portable card reader, according to an embodiment of the invention.

DETAILED DESCRIPTION OF THE INVENTION

The invention relates to a portable identity card/reader system for logical and physical access, is a continuation-in-part of the C16 patent application and a non-provisional filing of the C18 provisional patent application.

Summary of the C16 Patent Application

The C16 patent application describes a pocket-size RFID reader apparatus having a contactless interface and a slot for insertion of a contactless smart card fob, and having a biometric sensor, thereby providing two levels of personalization. The apparatus may have a wireless interface, and a slot for insertion of a wireless SD I/O device. The apparatus may have a slot for insertion of an external memory device. The apparatus may have a mechanical connection (contact) interface. The apparatus may also have an RF interface for reading an electronic immobilizer within the apparatus.

As set forth in the C16 patent application, the RFID reader has a contactless interface selected from the group consisting of ISO 14443, ISO 15693, NFC, and any similar interface. And it has an interface for communicating with an Internet-capable appliance; and the interface with the Internet-capable appliance in a Private Area Network is selected from the group consisting of Zigbee, NFC, Bluetooth, UWB, wireless USB, Infrared; and the interface with the Internet-capable appliance for a Local Area Network is selected from the group consisting of 802.11 a/b/g, 802.11n and WIMAX.

In addition, the RFID reader has a biometric membrane sensor with actuator for powering up the apparatus and authenticating the user. The apparatus can generate "One-Time-Passwords" and can synchronize itself with an Internet atomic clock. The apparatus battery can be charged through inductive coupling with a docking station.

The RFID reader can also be paired with an external Bluetooth/Zigbee dongle or token.

The dongle or token is inserted into an USB port of an Internet connected PC or host computer for the purpose of transmitting and receiving data in wireless mode to and from the RFID reader.

An important feature of the C16 patent application is the functional combination of the contactless card or fob with the reader, in applications (uses), meaning that the user carries the contactless card or fob in the RFID reader with multiple interfaces when performing a transaction or an exchange.

The traditional identification cards are proximity cards operating at low frequency (125 KHz) and communicating with an RFID reader in Wiegand protocol. However, there is a move in the access control market towards high frequency cards operating at 13.56 MHz in accordance with the ISO 14443 standard, but this is a slow process because of the installed base of low frequency systems.

In application, the user carries their ID card or badge attached to a lanyard which hangs from their neck. The ID card or badge has a slot to allow the lanyard to be clipped on. Alternatively the ID card or badge fits into a plastic sleeve with a corresponding slot.

In entering a building, a facility or a secure area, the user presents the ID card to an RFID reader usually mounted on a wall (mullion reader) at eye level. As the ID card is attached to a lanyard hanging from the neck of the user, the ID card is not forgotten by the user when the verification process is completed and the user is allowed to physically access the building, facility or secure area.

For computer logon at the user's desk, the situation is completely different, the user is required to remove their ID card from the lanyard and place it on an RFID reader to allow the user to logically access the network system.

Irrespective of the operating frequency of the ID card, a desktop RFID reader needs to be permanently attached to the user's computer.

A major disadvantage of the current solution for the dual purpose of physical and logical access is users tend to forget their ID card on the desktop RFID reader when leaving the building, and thus preventing them from re-entering.

As the installed base of desktop readers for logical access control is in its infant stage of business growth, integrators are presented with the problem of selecting a low or high frequency reader to match with the current in-house physical access control system.

The RFID reader apparatus described in Ser. No. 11/420,747 (C16) is RFID agnostic, supporting a variety of international standards. The apparatus can incorporate a thumbprint biometric membrane sensor with actuator which can be depressed to power-up the apparatus and to acknowledge a transaction. Slots are provided in the apparatus for the insertion of removable color-coded Secure Digital (SD) memory and SD input/output (I/O) devices. The apparatus can generate "One-Time Passwords" when in an electromagnetic field, in a wireless hot spot or can synchronize itself with an Internet atomic clock and precisely record all events and transactions with an exact time/date stamp. As the insertable contactless smart card fob can be personalized with encrypted keys (Login ID & Passwords), the RFID reader apparatus can issue an authorization signal or transmit keys for access to password protected sites via it's contactless or wireless interfaces when the biometric sensor captures a digital image of a live fingerprint which coincides with the template stored in the memory of the reader or contactless chip. As the keys can be updated on a regular basis using the Internet Atomic Clock for synchronization, secure Single Sign-on for a number of websites (specific to the personalized fob) can be achieved.

The contactless interface of the RFID reader apparatus can be in accordance with ISO 14443 & ISO 15693 and/or NFC. The contactless interface typically operates at 13.56 MHz.

The wireless interface of the RFID reader apparatus can be selected from the group; Zigbee, Bluetooth, WLAN 802.11, Wibree, UWB, USB wireless and/or any similar interface.

The traditional approach to authenticate the identity of a person or computer is the direct online communications via Online Certificate Status Protocol (OCSP) to a secured, trusted authority that can verify the validation of a digital certificate. OCSP is an Internet protocol used for obtaining the revocation status of an X.509 digital certificate. It is described in RFC 2560 and is on the Internet standards track. It was created as an alternative to certificate revocation lists (CRL), specifically addressing certain problems associated with using CRLs in a public key infrastructure (PKI). Messages communicated via OCSP are encoded in ASN.1 and are usually communicated over HTTP. The "request/response" nature of these messages leads to OCSP servers being termed "OCSP responders".

The C16 patent application describes an RFID reader apparatus that can validate whether a person is allowed to access a network (logical access) or enter a facility (physical access) using its wireless interface. Real time upgrading & revoking of privileges or authorizing certain activities and access permissions can be implemented when the user is in a WPAN (wireless personal area network) or a WLAN (wireless local area network) such as a hot spot or office building. Revoking or granting of privileges can be via the wireless interface of the apparatus and such messages can be embedded in the EEPROM of the RFID device or in mass storage. The transmission of real time credentials can be via the host, contactless or wireless interface.

The privileges are stored on the contactless smart card fob and have to be updated on a regular basis. As the fob is inserted into the RFID reader apparatus, the privileges are upgraded or revoked by communicating in wireless mode with a central server and then with the fob in contactless mode with these updates.

The Present Invention

Building on the C16 patent application concept of reader and contactless card being used in combination as paired devices for applications such as access control, ticketing and payment, it is proposed herein to improve on concept by changing the housing to resemble a card body with an opening to accommodate the attachment of a lanyard and grooves on each side of the housing to allow the user to slide in their identification card for physical access control.

The present invention resolves the problem of using proximity cards for physical access as well as for logical access, by replacing the desktop reader with a portable RFID reader and a Zigbee/Bluetooth/Wibree USB token.

The portable reader with multiple interfaces takes the place of the ID card as described above and may be attached to a lanyard. The user simply slides their proximity ID card into the grooves provided in the housing. Alternatively, the lanyard is clipped both to the portable reader and to the ID card.

For logical access, the portable reader communicates with the ID card in contactless mode at either 125 KHz or 13.56 MHz, and with the Zigbee/Bluetooth/Wibree USB token inserted into a port of the host computer in wireless mode.

In another embodiment of the invention, the portable reader can communicate with an UHF card.

As in the C16 patent application, the ID card can be in the form of a fob for insertion into a slot in the portable reader.

When the user is in the vicinity of their computer, a communication event is opened up between the Zigbee/Bluetooth/Wibree token and the portable reader, allowing the user to access the network after checking the credentials on the ID card via the reader. As soon as the user moves away from their computer, the communication signal between the portable reader and the Zigbee/Bluetooth/Wibree token deteriorates. Once a certain distance is reached between the token and the portable reader, the host computer is logged off automatically.

The user can download files from the host computer to the memory of the portable reader or to an extended memory inserted into a slot in the reader.

The reader can have a mechanical interface such as a mini USB socket to allow a hardwire connection to a USB port of the host computer.

In another embodiment of the invention, the portable reader can fit into a plastic sleeve which can also accommodate an ID card. To increase the read/write range of the ID card or ID fob a compensating antenna can be integrated into the plastic sleeve.

The reader can have slots to accommodate a payment fob, a customer loyalty fob or a coupon fob in applications as described in Ser. No. 10/990,296 filed Nov. 16, 2004 (C4). To increase the read/write range as described above, compensating antennae can be assembled at each contactless fob slot as well as around the perimeter of the portable reader.

The lanyard can also be used to pickup radio signals. Conversely, an antenna in the portable reader can be used to inductively charge the internal battery.

This engaged arrangement of a portable reader in the format of a card operating in conjunction with an ID card in close proximity and a Zigbee/Bluetooth/Wibree USB token connected to a host computer, enables multiple applications to be achieved using legacy technology.

This bundling of usages into an arrangement as described above can also be transferred to a keyless entry system for a motor vehicle. The portable reader with a slot or hatch to accommodate an immobilizer could be used for vehicle entry and ignition. The reader/immobilizer combination can be detected by the vehicle. Or, the reader/immobilizer in the format of a card can be inserted into an aperture in the console of the vehicle.

As described in the C16 patent application, the user can insert an SD memory stick containing MP3 files into a slot in the reader which can be played back on the vehicle entertainment system.

Not only can the reader transmit the MP3 files to the vehicle entertainment system when inserted into an aperture in the console, but also the reader battery can be charged up simultaneously.

The reader/immobilizer can have a biometric sensor, switching elements, an LED, a display, SD/IO slots and with the same functionalities as described in the C16 patent application.

In another embodiment of the invention, the USB Zigbee/Bluetooth/Wibree token can be replaced by a computer peripheral device such as a mouse with a Zigbee/Bluetooth/Wibree interface.

The signal strength from the Zigbee/Bluetooth/Wibree token determines the maximum distance in which the user can move away from their computer, before it logs-off from the network or goes into password protected security mode. Once the portable reader carried by the user is out of range of the Zigbee/Bluetooth/Wibree signal, the computer logs off automatically.

The arrangement of the portable reader and ID card may be referred to as a "reader/ID card system" in the remainder of this application.

In the work place, all employees will have a reader/ID card system hanging from the lanyard around their neck and the employee's computer will have a Zigbee/Bluetooth/Wibree token plugged into one of its USB ports (or equivalent). Although the token is paired with the user's reader and ID card for security, the token can detect the signal from other reader/ID card combinations. Hence, the Zigbee/Bluetooth/Wibree token can be used to determine the location of a person or an employee who carries a reader/ID card system in the work place.

The Zigbee/Bluetooth/Wibree token can also act as a wireless access point (AP).

The reader/ID card system can also be used in time & attendance applications. As soon as a token receives a signal from the reader in the work place, a time-of-arrival is detected. The internal clocks of the token and reader can be synchronized with an Internet atomic clock.

The Zigbee/Bluetooth/Wibree token can also have an RFID/NFC interface for the purpose of proximity identification at the user's computer & activating the reader/card system when in sleep mode. This arrangement is particularly interesting for applications such as network access and time & attendance.

The reader/ID card system may operate in passive and/or active mode.

Power Optimization & Charging

When the user leaves their work place, the reader does not (ceases to) detect any Zigbee/Bluetooth/Wibree signal from the token (plugged into the user's computer) and hence may go into "sleep mode" (to preserve battery power).

The reader of the reader/ID card system can be switched on from sleep mode when the reader/ID card system is presented to another reader such as a wall reader at the entrance of a building. Basically, the energy radiated from the wall reader switches on the reader carried by the employee. Alternatively, the user can switch on the reader manually.

The reader can be charged inductively, from a power source or from a computer when connected via a USB cable.

An Embodiment of Portable Identity Card/Reader System for Physical and Logical Access FIGS. 1 and 2 illustrate a portable card reader 100, according to an embodiment of the invention. The card reader 100 comprises a generally rectangular body 102, having a length dimension "x1", a height dimension "y1" and a thickness dimension "z1". The body 102 has a generally planar, generally rectangular front surface 104, measuring "x1" by "y1". Electronics (or circuitry, see FIG. 4) for the reader are contained within the body portion 102.

The body 102 has a slot 106 for hooking (attaching) the reader to a lanyard (not shown) which may be worn around a user's neck.

A contactless ID card 110 may be disposed in a recess (receptacle) 108 on the front surface 104 of the reader body 102. Grooves or barbs may be provided to hold the ID card 110 in place. Alternatively, the user can clip their ID card also to the lanyard, so as to be in close proximity to the reader body 102. The reader 100 and the card 110 are used in combination. The contactless ID card 110 may conform to ISO 7810 standard, and may be generally rectangular.

Exemplary dimensions for the body 102 are:
length x1=100.00 mm
height y1=75 mm
thickness z1=2.00 mm Exemplary dimensions for the contactless ID card 110 are:
length x2=85.60 mm
height y2=53.98 mm
thickness z2=0.76 mm FIG. 1 illustrates how a user can insert two contactless fobs 120 and 130 into the reader 100 for applications such as identification, payment, loyalty, ticketing, couponing etc. In addition, an SD memory stick 140 can be inserted into the reader 100 for the purpose of storing data. The data can be transferred to the memory stick in wireless mode from the host computer or the reader can be connected directly to a USB port of the host computer using a cable. Not shown is a mini USB socket in the reader.

FIG. 2 illustrates how the contactless fobs 120 and 130 can communicate in contactless mode with the reader 100. Two antenna coils 122 and 132 are positioned in the reader body 102 to communicate with the two contactless fobs 120 and 130, respectively, in a contactless mode. In addition, there is an antenna 112 positioned around the perimeter of the reader body 102 which can act as a compensating antenna or to communicate with the ID card 110. No antenna is needed for the SD card 140, since it uses a contact interface. An additional antenna (not shown) may be included as a stripe of metal on the motherboard of the reader, for communicating via wireless such as with a wireless token (see 372, below) plugged into a user's computer (see 370, below).

FIG. 3 illustrates an overall portable identity card/reader system for physical and logical access, according to an embodiment of the invention.

A portable reader apparatus 300 (compare 100), with a plurality of contactless cards 310 (compare 110) and 330 (compare 120 and/or 130) inserted therein, and extended memory 340 (compare 130) inserted therein, constitute what may be called a "reader/card system" 350.

For physical access, a user presents his reader/card system 350 near a wall reader 360 which is connected to a facility computer 362, and access to the facility may be provided and logged in. This is in contactless (close proximity) mode, as indicated by the two-headed arrow 366.

For logical access, a user is in proximity with his computer 370, and a wireless link is provided between the reader/card system 350 and a token 372 plugged into the computer 370. This is in wireless (vicinity) mode. The user can then use the computer, including accessing other networked computers 374, as indicated by the arrow 376.

Ensure Technologies has developed a product called Xyloc which detects a user when close to their PC in order to prevent security breaches from within a company. The product determines a user's location and automatically locks the user's computer when the user is not physically present. Basically, the company network is not compromised when an employee leaves his or her computer unattended. The wireless technology is based on 300, 800 or 900 MHz radio signals, depending on the country of installation. (Source: www.ensuretech.com)

Unlike the present invention, the solution provided by Ensure does not combine contactless (RFID reader/ID card system) with token technology for the dual purpose of physical and logical access.

Research In Motion (RIM) is a designer, manufacturer and marketer of wireless solutions for the mobile communications market and has developed the wireless handheld product BlackBerry®. Recent developments include the BlackBerry Smart Card Reader™ which is a lightweight, wearable smart card reader that enables controlled access to BlackBerry devices using Bluetooth® technology and advanced AES-256 encryption. The identification card which is inserted into a mechanical reader is an ISO 7816 compliant smart card. Source: www.rim.com & http://www.blackberry.com/products/accessories/smartcard.shtml Unlike the present invention, the solution provided by RIM does not combine contactless (RFID reader/ID card system) with wireless technology for the dual purpose of physical and logical access.

There has thus been described herein a portable RFID reader/card system (combination of reader and card) in the form of a card body structure with a slot to accommodate the attachment of a lanyard and grooves on each side of the housing to allow the bearer to slide in their proximity card for physical access control. The reader/card system communicates with the proximity card at close range (such as within only up to a few millimeters) in contactless mode at either 125 KHz or 13.56 MHz and communicates with an external reader over a longer range (such as up to 10 meters) at a specific frequency and with specific protocol modes. For example, when entering a building, a facility or a secure area, the user presents the reader/card system to an RFID reader usually mounted on a wall (mullion reader). The reader/card system communicates with the proximity card at the appropriate frequency and then communicates this information to the access control reader at the entrance to the building. This means that the proximity card does not necessarily need to communicate in the same manner as the reader/card system with the access control reader.

For logical access the portable reader/card system communicates in wireless mode with a Zigbee/Bluetooth/Wibree USB token inserted into (associated with) a USB port of the user's work station/personal computer.

When the user is in the vicinity of their computer (such as within 1-2 meters), a communication event is opened up between the Zigbee/Bluetooth/Wibree token and the reader/card system, allowing the user to access the network after checking the credentials on the proximity card via the reader/card system. As soon as the user moves away from their computer, the communication signal between the reader/card system and the Zigbee/Bluetooth/Wibree token deteriorates. The signal strength from the Zigbee/Bluetooth/Wibree token determines the maximum distance in which the user can move away from their computer, before it logs-off from the network or goes into password protected security mode. Once the reader/card system carried by the user is out of range of the Zigbee/Bluetooth/Wibree signal, the computer logs off automatically.

When the user leaves their work place, the reader/card system does not detect any Zigbee/Bluetooth/Wibree signal from the USB token and hence goes into sleep mode.

For physical access, the portable reader can be switched on from sleep mode when the reader/card system is presented to another reader such as a wall reader at the entrance of a building. Basically, the energy radiated from the wall reader switches on the reader/card system carried by the employee. Alternatively, the user can switch on the reader manually.

A battery in the portable reader can be charged inductively, from a power source or from a computer when connected via a USB cable.

The user can download files from the host computer to the memory of the portable reader/card system or to an extended memory card (such as SD) inserted into a slot in the unit.

The reader/card system can have slots to accommodate a payment fob, a customer loyalty fob or a coupon fob in applications as described in Ser. No. 10/990,296 filed Nov. 16, 2004 ("C4"). To increase the read/write range as described above, compensating antennae can be assembled at each contactless fob slot as well as around the perimeter of the reader/card system.

This engaged arrangement of a reader/card system in the format of a card body operating in conjunction with an identity card or badge in close proximity and a Zigbee/Bluetooth/Wibree USB token connected to a host computer, enables multiple applications to be achieved using legacy technology.

FIG. 4 is a diagram of major functional blocks of an RFID reader apparatus, according to the invention.

FIG. 4 corresponds generally to FIG. 2A of the C16 provisional, and illustrates major functional blocks of an embodiment of an RFID reader apparatus 400, which may include (but are not limited to):

memory 404 contact interfaces 406, such as (but not limited to) USB (or smart card ISO 7816)

a microprocessor 410 for controlling the operation of the other functional blocks contactless interfaces 412, such as (but not limited to) ISO 14443, ISO 15693 and NFC (and any similar interface)

storage 416, such as (but not limited to) a hard drive (HDD)

wireless interfaces 418, such as (but not limited to) IEEE 802.11, Bluetooth, Zigbee, Wibree, etc card slots 424 (which are contact interfaces) for inserting SD cards, and the like Storage 416 may be an internal flash drive or an HDD augmented by external memory such as a removable SD memory stick. (Memory 404 may be standard RAM for the microprocessor 410.)

Such an RFID reader apparatus 400 with multiple interfaces (mechanical, contactless, wireless and optical), extended memory (flash and/or hard disk drive) and a slot to insert a transponder device or contactless smart card fob, as discussed hereinbelow, can be used in a plethora of applications such as logical and physical access, secure identification, ticketing, payment and e-commerce.

The RFID reader apparatus 400 may be configured for transferring messages & data from the contactless interface 412 to the wireless interface 418 in active mode and to run contactless to wireless applications.

The RFID reader apparatus 400 may be configured for interfacing with the Internet (via TCP/IP interface 430) and emulating a smart card. In real world applications, the apparatus is a "mobile wallet" used as prepaid electronic cash, tickets, ID, access to buildings and corporate networks, membership cards for clubs and loyalty programs, etc.

The RFID reader apparatus 100 may include a standard-compliant contactless interface and a wireless client interface; wherein the contactless interface 412 complies to one or more of the following standard interfaces: RFID-contactless interface according to ISO 14443 & ISO 15693 and NFC; and wherein the wireless client interface 418 comprises at least one of the interfaces selected from the group consisting of Zigbee, Bluetooth, Wibree, WLAN 802.11, UWB, USB wireless and any similar interface.

Multiple ISO Standard Protocols (Mifare, ISO 14443, ISO 15693, etc) can be stored or masked to memory 404, making the apparatus RFID agnostic (any standard communication interface) for use in a combination of applications such as physical & logical access as well as payment.

The RFID reader apparatus 400 may operate in conjunction with the inserted contactless smart card fob (116, FIG. 1B) and communicates with;
- an Internet connected PC via it's mechanical (contact) interface such as USB,
- an external RFID terminal via it's contactless interface,
- an external dongle or token plugged into a PC via it's Zigbee/Bluetooth/Wibree interface (PAN),
- a mobile device via it's NFC/Bluetooth interface, and with a WiFi network (WAN) via it's wireless interface.

The communication protocol between the RFID reader apparatus 400/Contactless smart card fob 116 and an external (see FIG. 3) RFID reader, terminal, handheld or kiosk can include transponder information or electronic value residing in the memory of the contactless chip and/or an authorization signal with encrypted keys (generated by matching a stored biometric template with a live fingerprint or thumbprint scan).

A downside to existing authentication devices such as "One-Time-Password" tokens is that they do not replace facility access badges, and cannot be issued or administrated directly from the physical access control system console.

The portable identity card/reader system disclosed herein allows employees, contractors, customers and business partners to securely access corporate facilities and IT resources. Via the wireless interface, the apparatus can be used by network administrators to manage user privileges and access to services; register, activate, and revoke certificates of authentication as required; and ensure that all digital certificates are valid and enforced.

The portable identity card/reader system disclosed herein can generate a new pass code every sixty seconds based on the HOTP algorithm endorsed by the Initiative for Open Authentication (OATH).

Via the wireless interface, the portable identity card/reader system disclosed herein can receive time- and event-based messages.

Using the wireless interface, data and applications can be added, removed, or changed after the portable Identity Card/Reader system has been issued, eliminating the time and cost of reissuing new devices. Applications can range from cafeteria payments to enterprise network sign-on. In a single process, employee access to areas such as gated entrances, buildings, or networks can be updated or revoked.

Users can securely login to a remote server using the Identity Card/Reader system and be protected against password snooping, man-in-the-middle, keyboard logging, spoofing, phishing, pharming and Trojan attacks In telephone banking, callers flagged as high risk can be challenged with authentication in the form of one-time passwords, biometric voiceprint samples, or additional content match questions. The portable Identity Card/Reader system 400 can be provided with a speaker microphone interface 440 and speech recognition facility 442. This can provide a level of personalization, such as for sending a password via a wireless network.

Access to the in-built timer in synchronization with an Internet Atomic clock or server clock allows applications such as temporary web-coupons or the use of time based PINs.

For long range communication such as in garage access, the standard IEEE 802.15.4 in-vehicle gate access solution (400 MHz) can be applied.

Form Factor

The portable identity card/reader system may have the form factor of a card body, but other form factors such as watch, wrist band, key fob or belt clip design are also possible.

Energy Harvesting

In a building, the portable identity card/reader system can draw energy from the environment, such as picking up the electrical energy (50/60 Hertz) and using it to charge up its internal battery. Alternatively, the energy can be drawn from the office lights (using a photovoltaic cell, such as is common in card-size calculators).

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A portable RFID reader/card system for physical access or logical access comprising:
    a generally rectangular reader body;
    circuitry disposed within the reader body;
    a contactless ID card disposed in close proximity to the reader body;
    an antenna positioned around the perimeter of the reader body which can act as a compensating antenna or to communicate with the contactless ID card;
    at least one antenna coil disposed in the reader body for communicating with corresponding at least one contactless fob inserted into the reader body in a contactless mode.

2. The portable RFID reader/card system of claim 1, wherein:
    the circuitry is arranged to communicate with the contactless ID card in a contactless mode and with an external reader in a wireless mode.

3. The portable RFID reader/card system of claim 2, wherein:
    the contactless ID card is disposed in a recess in a surface of the body portion.

4. The portable RFID reader/card system of claim 2, wherein:
    the contactless ID card is clipped to a lanyard which is attached to the body portion.

5. The portable RFID reader/card system of claim 1, further comprising:
    a contact interface for an SD card inserted into the reader.

6. The portable RFID reader/card system of claim 1, wherein:

the at least one antenna coil comprises two antenna coils for communicating with corresponding two contactless fobs inserted into the reader body in the contactless mode.

7. The portable RFID reader/card system of claim 1, further comprising:
an additional antenna for communicating via a wireless token plugged into a user's computer.

8. The portable RFID reader/card system of claim 1, wherein the circuitry comprises:
a contactless interface; and
a wireless interface.

9. The portable RFID reader/card system of claim 8, wherein:
the contactless interface is selected from the group consisting of ISO 14443, ISO 15693, NFC, and any similar interface.

10. The portable RFID reader/card system of claim 8, wherein:
the wireless interface is selected from the group consisting of IEEE 802.11, Bluetooth, Zigbee, Wibree, and any similar interface.

11. A method of using a contactless ID card for physical entry comprising:
disposing the ID card in close proximity to a portable reader system; and
presenting the combination of card and reader apparatus to a mullion reader;
wherein the portable reader system comprises:
a generally rectangular reader body;
circuitry disposed within the reader body;
a contactless ID card disposed in close proximity to the reader body;
an antenna positioned around the perimeter of the reader body which can act as a compensating antenna or to communicate with the contactless ID card;
at least one antenna coil disposed in the reader body for communicating with corresponding at least one contactless fob inserted into the reader body in a contactless mode.

12. A method of using a contactless ID card for logical access comprising:
disposing the ID card in close proximity to a portable reader system; and
presenting the combination of card and reader apparatus to a wireless token associated with a personal computer;
wherein the portable reader system comprises:
a generally rectangular reader body;
circuitry disposed within the reader body;
a contactless ID card disposed in close proximity to the reader body;
an antenna positioned around the perimeter of the reader body which can act as a compensating antenna or to communicate with the contactless ID card;
at least one antenna coil disposed in the reader body for communicating with corresponding at least one contactless fob inserted into the reader body in a contactless mode.

13. The method of claim 12, wherein:
when the user is in the vicinity of their computer, a communication event is opened up between the wireless token and combination of reader and ID card, thereby allowing the user to access a network after checking the credentials on the proximity (ID) card via the reader/card system.

14. The method of claim 13, further comprising:
when the user moves away from their computer, the communication signal between the reader/card system and the wireless token deteriorates, and the computer automatically logs-off from the network or goes into password protected security mode, once the reader/card system carried by the user is out of range of the Zigbee/Bluetooth.

15. The method of claim 13, wherein the token uses a standard selected from the group consisting of Zigbee, Bluetooth, and Wibree.

* * * * *